United States Patent
Murakami et al.

(10) Patent No.: US 6,471,877 B1
(45) Date of Patent: Oct. 29, 2002

(54) FILTER DEVICE FOR POLYCARBONATE AND PRODUCTION METHOD FOR POLYCARBONATE

(75) Inventors: Masahiro Murakami, Iwakuni (JP); Yoshiki Matsuoka, Iwakuni (JP); Toru Sawaki, Iwakuni (JP); Katsushi Sasaki, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/763,944

(22) PCT Filed: Jun. 20, 2000

(86) PCT No.: PCT/JP00/04014
§ 371 (c)(1),
(2), (4) Date: Sep. 28, 2001

(87) PCT Pub. No.: WO01/00298
PCT Pub. Date: Jan. 4, 2001

(30) Foreign Application Priority Data

Jun. 30, 1999 (JP) .............................. 11-185183

(51) Int. Cl.$^7$ .............................................. B01D 35/30
(52) U.S. Cl. .................. 210/767; 210/346; 210/438; 210/441; 210/450; 210/456
(58) Field of Search ............. 210/323.2, 345–347, 210/350, 351, 437, 438, 446, 448, 457, 458, 486, 488, 492, 767, 441, 450, 456; 425/199

(56) References Cited

U.S. PATENT DOCUMENTS

| | | | |
|---|---|---|---|
| 3,581,902 A | * 10/1968 | Bidler | 210/347 |
| 4,793,928 A | * 12/1988 | Tsukamoto et al. | 210/344 |
| 5,516,878 A | 5/1996 | Sasaki et al. | 528/199 |
| 5,916,443 A | * 6/1999 | Mueller et al. | 210/436 |

FOREIGN PATENT DOCUMENTS

| | | | |
|---|---|---|---|
| DE | 648439 | * 10/1934 | 210/350 |
| JP | 59/20807 | 2/1984 | B01D/29/34 |
| JP | 60-17210 | 2/1985 | B01D/29/34 |
| JP | 7-268091 | 10/1995 | C08G/64/30 |
| JP | 9-122408 | 5/1997 | B01D/29/39 |
| JP | 9-314643 | 12/1997 | B29C/47/68 |

OTHER PUBLICATIONS

Mikio Matsugane, "Plastic Zairyou Kouza 5 : Polycarbonate Jushi", Nikkan Kogyo (Tokyo), Sep., 30, 1969, p. 62–67.

International Search Report, PCT/JP00/04014.

* cited by examiner

*Primary Examiner*—Matthew O. Savage
(74) *Attorney, Agent, or Firm*—Sughrue Mion, PLLC

(57) ABSTRACT

Provided are a filtration apparatus for a polycarbonate comprising a filtration container, a flange plate, one or more leaf disc-type filters, a filter press and a center pole having an integral construction with the filter press as constituting elements, these components having specific structures, and a process for manufacturing a polycarbonate using the filtration apparatus. Foreign materials are effectively removed by using the polymer filter, and at the same time, discoloring, crosslinking and gel formation, which would occur in the filter, are suppressed; and as a result, a polycarbonate having excellent quality can be manufactured.

8 Claims, 3 Drawing Sheets

PRIOR ART

FILTER DEVICE FOR POLYCARBONATE AND PRODUCTION METHOD FOR POLYCARBONATE

TECHNICAL FIELD

The present invention relates to a process for manufacturing a polycarbonate having few foreign materials. More specifically, this invention relates to a process for manufacturing a polycarbonate having few foreign materials by using a polymer filter.

BACKGROUND ART

Generally, foreign materials in polycarbonates are classified into foreign materials got mixed from raw materials or from the outside of a reaction system, and those generated in a reaction apparatus or in a passage for a highly viscous material obtained by reaction. Against the former, a preventing means for contamination comprises the use of a filter for filtering foreign materials in raw materials or the improvement of closeness (tightness) of the reaction system. On the other hand, against the latter, foreign materials are removed by using a filtration filter directly before the highly viscous material is processed into a desired form.

DISCLOSURE OF THE INVENTION

However, depending on the temperature or viscosity of a melting polymer to be filtered, the retained particle diameter of a filtration filter or the amount of treated materials, deterioration attributable to retention such as discoloring, cross-linking, gel generation would occur in a filtration filter, exerting great influence on the product quality.

Recently, especially in a polycarbonate used for optical applications such as DVD, MO or CD-R, which require high density and high accuracy, problems of foreign materials, discoloring, and gel generation have direct influence on optical properties such as block error rate, or on mechanical properties such as tensile strength, flexural strength and toughness of the final products, and these problems therefore are serious. Further, because gels characteristically change their shapes, those having a size even larger than the retained particle diameter of a filter would pass the filter, in some case, and this causes extremely severe problems.

The object of the present invention is to provide a process for solving problems of the above-mentioned prior arts, efficiently removing foreign materials by using a polymer filter, and suppressing the occurrence of discoloring, crosslinking and gel formation in the filter, at the same time, in order to manufacture a polycarbonate having excellent quality.

The present invention comprises the following.

1. A filtration apparatus for a polycarbonate comprising as constituent elements:
   (a) a filtration container having a polymer inlet passage and an opening;
   (b) a flange plate interfitting with the opening;
   (c) one or more leaf disc-type filters for filtering a polymer introduced into the filtration container through the polymer inlet passage;
   (d) a filter presser for fixing the leaf disc-type filters to each other and applying sealing pressure on the junction parts of the leaf disc-type filters; and
   (e) a center pole placed on a space formed by the inner circumferences of the leaf disc-type filters, for collecting the polymer filtered by the leaf disc-type filters and for discharging it outside the filtration apparatus, and integrated with the filter presser.

2. A filtration apparatus according to above 1 characterized in that the center pole penetrates the flange plate, the flange plate has a sealing part for preventing the intrusion of a polymer down along the center pole into the penetration part of the center pole on the filtration container side of the flange plate, and the flange plate has a fixture for fixing the center pole with the flange plate on the side opposite to the filteration container of the flange plate.

3. A filtration apparatus according to above 1 or 2 characterized in that the center pole has a polymer flow passage through the inner side thereof on the portion corresponding to the section where the center pole penetrates the flange plate.

4. A filtration apparatus according to any one of above 1 to 3 characterized in that the shape of the cross section of the center pole is substantially a polygon or star shape having plural apexes and the length of each portion where the center pole contact with the inner circumference of the leaf disc-type filter is 3 mm or less on the cross section.

5. A filtration apparatus according to any one of above 1 to 4 characterized in that cross-sectional area of polymer flow passage which form between the center pole and the inner circumferences of a leaf disc-type filter increases continuously as it goes downstream along the polymer flow.

6. A filtration apparatus according to any one of above 1 to 5 characterized in that the boundary formed between the surface (a) substantially perpendicular to the center pole which is on the filtration container side of the flange plate, and the surface other than this surface (a) is a curved surface having a curvature of 1 mm or more.

7. A filtration apparatus according to any one of above 1 to 6 characterized in that the polycarbonate has a viscosity average molecular weight of 10,000 or more.

8. A filtration apparatus according to any one of above 1 to 7 characterized in that the polycarbonate is manufactured by polymerizing an aromatic diol compound and a carbonic acid diester compound in the presence or absence of a catalyst.

9. A process for manufacturing a polycarbonate characterized in that a filtration apparatus according to any one of above 1 to 8 is used for filtering the polymer.

It was made clear that, being different from polyesters such as polyethylene terephthalate, when a polycarbonate is heated for a long time even in non-oxygen atmosphere at such a high temperature as is enough to melt a polycarbonate, it forms a crosslinked structure, and eventually a material, called gel, having a viscoelastic behavior different from that of polycarbonate, and an insoluble substance, and the hue is also deteriorated.

For this reason, it is important to reduce, as much as possible, sections where polymer stagnates, which is called dead space, in the filtration of a polycarbonate.

Filtration apparatuses conventionally used for filtering a polymer include those of a candle type and a plate type besides a leaf disc type, but the leaf disc-type filtration apparatus is preferred for filtering a polycarbonate from the view points of the above-mentioned dead space, filtration area and the exchangeability of filters.

However, in the leaf disc type filtration apparatus, because plural toroidal filters to be used are stacked up so that the polymer filtered through them is collected and discharged outside the filtration apparatus via a center pole (a hollow or grooved rod), sealing members placed on the inner circumference of the toroidal filters must be closely joined to each other so that the unfiltered polymer existing outside the filters does not mix with the filtered polymer existing inside the filters or the center pole. Hence, in a conventional leaf disc-type filtration apparatus, a filter presser is placed at an end of the stacked leaf disc-type filters, a center pole is placed through a space formed by the inner circumference of the stacked leaf disc filters, and these elements are tightened with fixtures such as bolts and nuts in order to assemble the filtration apparatus.

Accordingly, the bolts and nuts used for tightening come to contact with the molten polymer, and gaps formed at tightening parts act as dead space, resulting with problems such as deterioration of the hue of the obtained polymer and gel formation.

According to the present invention, the filter presser and the center pole have an integral structure, whereby dead space is not formed, and bolts for tightening the center pole and the filters are not needed. Further, when nuts are made not to contact with a molten polymer, dead space is not formed, and the deterioration of polymer is prevented to make possible to produce a polycarbonate having excellent quality. Here, "the filter presser and the center pole have an integral structure" means that the filter presser and the center pole are not separable into plural parts.

In the present invention, it is preferable that the shape of cross section of the center pole in the direction perpendicular to its axis where the center pole contacts with the inner circumference of a leaf disc-type filter is substantially a polygon or a star shape having plural apexes. Such a shape allows that the filtered polymer flows out toward the outside of the system through a polymer passage formed by the outer circumference of the center pole (that is, the circumference formed by linking the apexes of the external polygonal or star-like shape in the cross-section of the center pole part in the direction perpendicular to its axis), the grooves carved on the center pole part, and the inner circumferences of the leaf disc-type filters, and therefore, dead space formed to a considerably lesser extent than in the case of a hollow center pole. Further, the area where the inner circumferences of the leaf disc-type filters are in contact with the outer circumference of the center pole is small. Thus, the dead space generation on the contacting surfaces can be avoided. In this regard, the length of each portion where the center pole contact with the inner circumference of the leaf disc-type filter is more preferably 3 mm or less on the cross section.

Further, while the amount of the filtered polymer flowing through the polymer passage of the center pole increases as the flow approaches the flange plate, that is, the amount increases as the flow of the polymer goes downstream, it is preferable that the pressure loss caused by the flow of the polymer is made small in order to realize good filtration. For this purpose, the cross sectional area of polymer flow passage which form between the center pole and the inner circumferences of a leaf disc-type filter preferably increases continuously as the polymer flow goes downstream along the polymer flow. In concrete, for example, the depth of the grooves formed on the center pole is preferably made deeper as the polymer flow approaches the flange plate.

In the present invention, the center pole preferably has a hollow polymer passage in the area where it penetrates the flange plate. By this structure, it becomes possible that fixtures such as a fixture nut for the center pole are prevented from contact with polymer.

In the present invention, when a polymer flows inside of the filtration apparatus formed by the filtration container and the flange plate, the polymer flow direction is changed drastically near the juncture of the filtration container and the flange plate, and dead space is apt to be generated there.

So, a corner having a curved surface of a curvature of 1 mm or more is preferably formed on the flange plate side.

DESCRIPTION OF THE DRAWINGS

In FIGS. 1 and 2 the polymer before filtration is introduced into the inside of a filtration apparatus formed with a filtration container 1 and a flange plate 2 via a polymer flow passage 3 formed in the filtration container 1. Inside the filtration apparatus, one or more leaf disc-type filters 5 and spacers 6 are stacked together, and a center pole 7 is placed in the space formed by the inner circumferences of the leaf disc-type filters. As a sealing member for preventing the intrusion of the polymer along the center. pole from entering into the above-mentioned penetration part, a sealing packing 9 is placed between a filter presser 4 for the leaf disc-type filter 5 and the flange plate 2 on the filter container side of the flange plate. Here, the filter presser 4 and the center pole 7 have an integral construction having no seam, and the center pole 7 penetrates the flange plate 2. By applying a sealing pressure through tightening a fixture, that is a fixture nut 8, which is placed on the flange plate 2 opposite to the filtration container, the sealings of joining parts of the leaf disc-type filters, that is, the sealing between each of the leaf disc-type filters 5 with a spacer 6 in-between, the sealing between a leaf disc-type filter 5 and the filter presser 4 with a spacer 6 in-between, and the sealing between a leaf disc-type filter 5 and the flange plate 2 in-between with a spacer 6, are achieved, thereby fixing the center pole and the flange plate.

Figure 1:
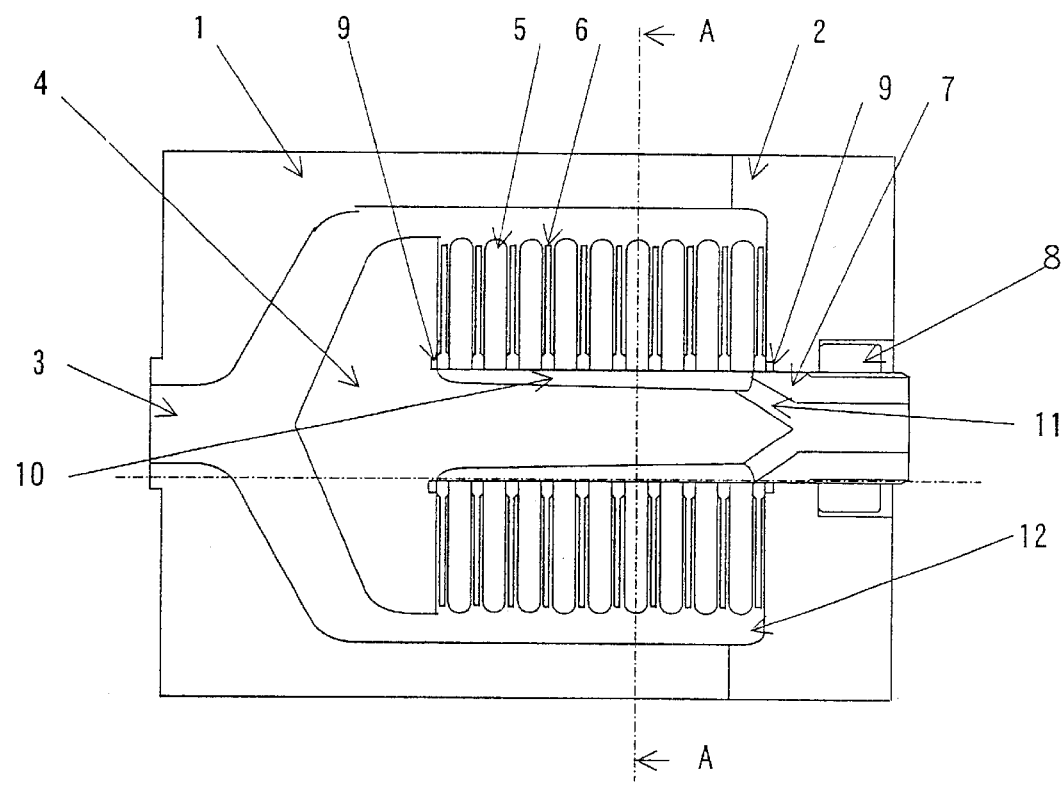
FIG. 1 shows an example of the filtration apparatus of the present invention.
Figure 2:
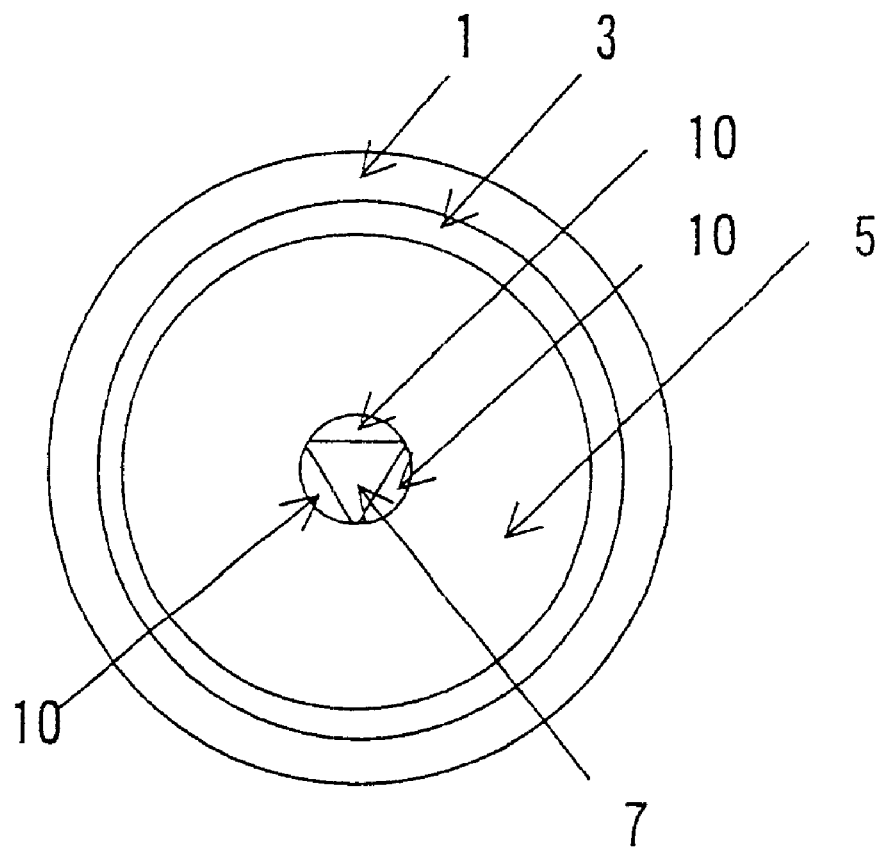
FIG. 2 is the A—A cross-sectional view of FIG. 1.

The polymer introduced into the inside of the filtration apparatus is filtered with the leaf disc-type filters 5, passes through the leaf disc-type filters 5, is collected into the polymer passage 10 formed by the inner circumferences of the leaf disc-type filters 5, the outer circumference of the center pole 7 and the grooves carved on the surface of the center pole, and is subsequently discharged outside the system via a hollow polymer passage (a hole formed inside the center pole) 11 in such a manner that the polymer passes inside the center pole at the portion where the center pole penetrates the flange plate.

Further the filter container 1 and the flange plate 2 are joined without gaps in metal touch, using a hollow metallic O-rings or the like on the joining surfaces as required. The boundary 12 between the surface substantially perpendicular to the center pole 7 which is also on the filtration container side of the flange plate 2, and the other surface, is finished so that it has a curved surface having a curvature of 1 mm or more so as to prevent dead space generation.

Further, heaters are commonly placed outsides the filtration container 1 and the flange plate 2, and a detecting element for controlling temperature is placed on the filtration container 1, although these are not shown in FIG. 1.

The material of the leaf disc-type filter 5 is not specifically limited as far as it is inactive against a polycarbonate obtained by polymerization and does not generate any eluate into the polycarbonate; however, a metal, especially stainless steel is commonly used; for example, SUS304, SUS316 or the like is preferably used.

Figure 3:
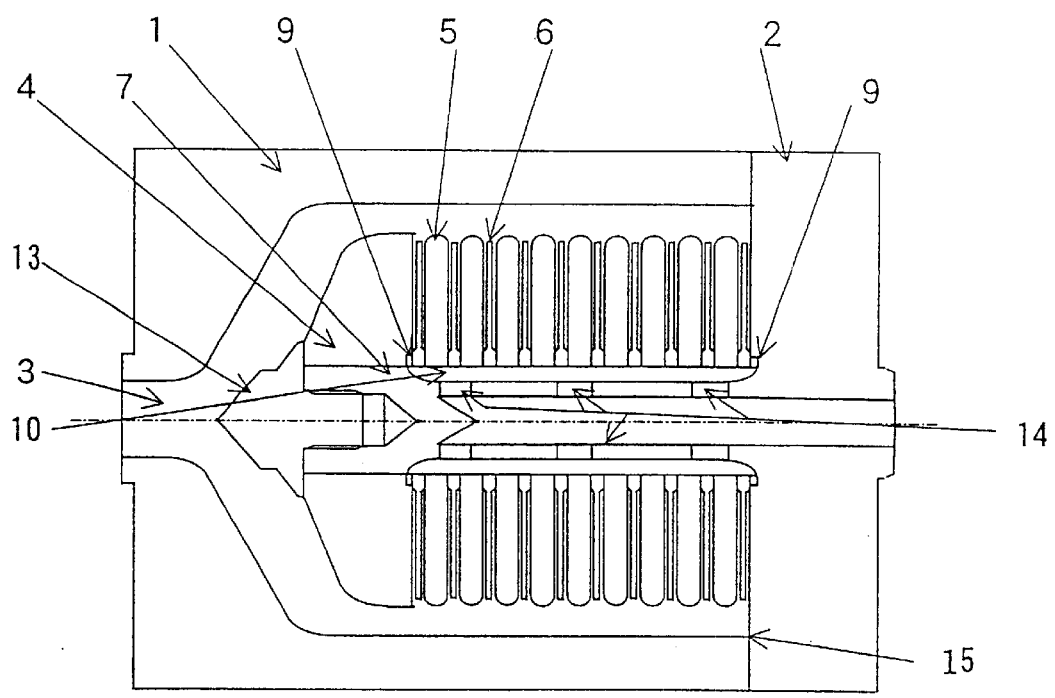
FIG. 3 shows a prior art filtration apparatus.

FIG. 3 shows a filtration apparatus partially lacking a part of the invention specifying elements of the present invention to compare the present invention with prior arts.

In FIG. 3, a center pole 7 is not integrated with a filter presser 4, but it is integrated with a flange plate 2, and the filter presser 4 is fixed to leaf disc-type filters 5 by inserting a fixing bolt 13 into a thread groove of the center pole 7 and tightening it. Further, the boundary 15 between the surface substantially perpendicular to the center pole which is also on the filtration container side of the flange plate 2, and the other surface (the surface where the filtration container 1 is in contact with the flange plate 2), forms a right angle cross-section and is not curved.

The polymer introduced into the inside of the filtration apparatus is filtered with the leaf disc-type filters 5, passes through the leaf disc-type filters 5 and is taken out outside the system via a hollow polymer passage 14.

There is no specific limitation on the aromatic polycarbonate of the present invention, and an aromatic polycarbonate obtained by reacting an aromatic diol compound with a carbonate precursor is usable. Examples of the polycarbonate include an interfacial polymerization polycarbonate, which is obtained through the reaction of an alkali metal salt of an aromatic diol with phosgene and a melt polymerization polycarbonate, which is obtained through the reaction of an aromatic diol with an aromatic carbonic acid diester. Among these aromatic polycarbonates, the polycarbonate which is obtained by melt polymerization is most suited for executing the present invention because it can be obtained directly in a molten state from a polymerization reactor and does not need remelting of the polymer.

The method for manufacturing a polycarbonate through melt polymerization means the method in which an aromatic diol compound and a carbonic acid ester are subjected to melt polycondensation in the presence of a transesterification catalyst consisting of a basic nitrogen compound, an alkali metal compound and/or an alkaline earth metal compound, or the like.

Concrete examples of the aromatic diol compound include bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3,5-dichloro-4-hydroxyphenyl)oxide, p,p'-dihydroxydiphenyl, 3,3'-dichloro-4.4'-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide bis(4-hydroxyphenyl)sulfoxide, or the like. Out of these, 2,2-bis(4-hydroxyphenyl)propane is especially preferable.

As the carbonic acid diester, concretely, diphenyl carbonate, ditolyl carbonate, bis(chlorophenyl) carbonate, m-cresyl carbonate, dinaphthyl carbonate, bis(diphenyl) carbonate, dimethyl carbonate, diethyl carbonate, dibutyl carbonate, dicyclohexyl carbonate or the like is used. Among these compounds, diphenyl carbonate is preferred.

Further, the polycarbonate in the present invention is allowed to contain as necessary; for example, ethylene glycol, 1,4-butanediol, 1,4-cyclohexanedimethanol, 1,10-decanediol or the like as an aliphatic diol compound; also for example, succinic acid, isophthalic acid, 2,6-naphthalenedicarboxylic acid, adipic acid,. cyclohexanedicarboxylic acid, terephthalic acid or the like as a dicarboxylic acid compound; and also a hydroxycarboxylic acid compound, for example, lactic acid, p-hydroxybenzoic acid, 6-hydroxy-2-naphthoic acid or the like.

Examples of the alkali metal compound used as the catalyst include hydroxides, hydrogen carbonates, carbonates, acetic acid salts, nitric acid salts, nitrous acid salts, sulfurous acid salts, cyanic acid salts, thiocyanic acid salts, stearic acid salts, boron hydride salts, benzoic acid salts, hydrogen phosphoric acid salts, bisphenol salts and phenolic salts, etc., of alkali metals.

Concrete examples include sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenyl borate, sodium benzoate, potassium benzoate, lithium benzoate, disodium hydrogenphosphate, dipotassium hydrogenphosphate and dilithium hydrogenphosphate; disodium salt, dipotassium salt and dilithium salt of bisphenol A; sodium salt, potassium salt and lithium salt of phenol; and the like.

Examples of the alkaline earth metal compound used as the catalyst include hydroxides, hydrogencarbonates, carbonates, acetic acid salts, nitric acid salts, nitrous acid salts, sulfurous acid salts, cyanic acid salts, thiocyanic acid salts, stearic acid salts, benzoic acid salts, bisphenol salts, phenolic salts, etc., of alkaline earth metals.

Concrete examples include calcium hydroxide, barium hydroxide, strontium hydroxide, calcium hydrogencarbonate, barium hydrogencarbonate, strontium hydrogencarbonate, calcium carbonate, barium carbonate, strontium carbonate, calcium acetate, barium acetate, strontium acetate, calcium nitrate, barium nitrate, strontium nitrate, calcium nitrite, barium nitrite, strontium nitrite, calcium sulfite, barium sulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate and strontium benzoate; calcium salt, barium salt and strontium salt of bisphenol A; calcium salt, barium salt and strontium salt of phenol; and the like.

In the present invention, as desired, (a) an alkali metal salt of an ate complex of an element of the 14th group of the periodic table or (b) an alkali metal salt of an oxo acid of an element of the 14th group of the periodic table can be used as the alkali metal compound of the catalyst. The elements of the 14th group of the periodic table means silicon, germanium and tin. (a) The alkali metal salts of the ate complex of the element of the 14th group of the periodic table are those described in JP-A 7-268091 (JP-A means Japanese unexamined patent publication). Concrete examples of the alkali metal salts include germanium (Ge) compounds such as $NaGe(OMe)_5$, $NaGe(OEt)_3$, $NaGe(OPr)_5$, $NaGe(OBu)_5$, $NaGe(OPh)_5$, $LiGe(OMe)_5$, $LiGe(OBu)_5$ and $LiGe(OPh)_5$.

Examples of the compound of tin (Sn) are $NaSn(OMe)_3$, $NaSn(OMe)_2(OEt)$, $NaSn(OPr)_3$, $NaSn(O-n-C_6H_{13})_3$, $NaSn(OMe)_5$, $NaSn(OEt)_5$, $NaSn(OBu)_5$, $NaSn(O-n-C_{12}H_{25})_5$, $NaSn(OEt)$, $NaSn(OPh)_5$, and $NaSnBu_2(OMe)_3$.

(b) Also, as the alkali metal salt of the oxo acid of the element of the 14th group of the periodic table, for example, alkali metal salts of silicic acid, stannic acid, germanous (II) acid, and germanic (IV) acid are cited as preferable.

The alkali metal salt of silicic acid is, for example, an acidic or neutral alkali metal salt of monosilicic acid or condensed compound thereof of which examples include monosodium orthosilicate, disodium orthosilicate, trisodium orthosilicate and tetrasodium orthosilicate.

The alkali metal salt of stannic acid is, for example, an acidic or neutral alkali metal salt of monostannic acid or condensed compound thereof of which examples include disodium monostannate ($Na_2SnO_3 \cdot XH_2O$, X=0 to 5) and tetrasodium monostannate ($Na_4SnO_4$).

The alkali metal salt of germanous (II) acid is, for example, an acidic or neutral alkali metal salt of monogermanous acid or condensed compound thereof of which examples include monosodium germanate ($NaHGeO_2$).

The alkali metal salt of germanic (IV) acid is, for example, an acidic or neutral alkali metal salt of monogermanic (IV) acid or condensed compound thereof of which examples include monolithium orthogermanate ($LiH_3GeO_4$), disodium orthogermanate, tetrasodium orthogermanate, disodium digermanate ($Na_2Ge_2O_5$), disodium tetragermanate ($Na_2Ge_4O_9$) and disodium pentagermanate ($Na_2Ge_5O_{11}$)

An alkali metal compound or alkaline earth metal compound as the catalyst is preferably used in such a manner that an alkali metal element or alkaline earth metal element in the catalyst is $1\times10^{-8}$ to $5\times10^{-5}$ equivalent based on 1 mol of an aromatic diol compound. More preferable ratio is attained by using $5\times10^{-7}$ to $1\times10^{-5}$ equivalent on the same basis.

When the amount of an alkali metal element or alkaline earth metal element in the catalyst deviates from the range of $1\times10^{-8}$ to $5\times10^{-5}$ equivalent based on 1 mol of an aromatic diol compound, unfavorable troubles are caused, that is, bad influence is exerted on several properties of the obtained aromatic polycarbonate, the transesterification reaction does not sufficiently proceed, and as a result, an aromatic polycarbonate having high molecular weight is not obtained, or the like.

Also, examples of the nitrogen-containing basic compound as the catalyst include; ammonium hydroxides having an alkyl, aryl, alkylaryl group or the like such as tetramethylammonium hydroxide ($Me_4NOH$), tetraethylammonium hydroxide ($Et_4NOH$), tetrabutylammonium hydroxide ($Bu_4NOH$), benzyltrimethylammonium hydroxide (F—$CH_2$ ($Me)_3NOH$) and hexadecyltrimethylammonium hydroxide; tertiary amines such as triethylamine, tributylamine, dimethylbenzylamine and hexadecyldimethylamine; and basic salts such as tetramethylammonium borohydride ($Me_4NBH_4$), tetrabutylammonium borohydride ($Bu_4NBH_4$), tetrabutylammonium tetraphenyl borate ($Me_4NBPh_4$) and tetrabutylammonium tetraphenyl borate ($Bu_4NBPh_4$).

The above-mentioned nitrogen-containing basic compound is preferably used in such a manner that the amount of the compound is $1\times10^5$ to $5\times10^3$, more preferably $2\times10^{-5}$ to $5\times10^{-4}$, especially preferably $5\times10^{-5}$ to $5\times10^4$ equivalent in terms of ammoniacal nitrogen atom in the nitrogen-containing basic compound based on 1 mol of the aromatic diol compound.

In this description of the present invention, the ratio of the alkali metal compound, alkaline earth metal compound or nitrogen-containing basic compound to the loaded aromatic diol compound (also referred to as an aromatic dihydroxy compound) has been expressed as "the amount of Z (compound name) in W (numerical value) equivalent in terms of a metal or basic nitrogen based on one mole of an aromatic dihydroxy compound". This means that, for example, when Z has one sodium atom like in sodium phenoxide or 2,2-bis(4-hydroxyphenyl)propane monosodium salt, or Z has one basic nitrogen like in triethylamine, the amount of Z is the amount corresponding to W mol, and when Z has two sodium atoms like in 2,2-bis(4-hydroxyphenyl)propane disodium, the amount of Z is the amount corresponding to W/2 mol.

In polycondensation reaction of the present invention, at least one kind of a co-catalyst selected from a group consisting of an oxo acid and an oxide of an element of the 14th group of the periodic table is allowed to coexist with the above catalyst as necessary.

By using such a co-catalyst in a specific ratio, it is possible to suppress more effectively unfavorable side reactions such as the branching reaction, which tends to occur in the polycondensation reaction, the generation of foreign materials in an apparatus during the molding process, and yellowish, without giving adverse effects on the terminal blocking reaction and the reaction velocity of polycondensation.

There is no particular limitation to molecular weight of the polycarbonate used in the present invention, however, the polycarbonate having a lower molecular weight has poor properties, and its usage is extremely limited, so that a polycarbonate having a viscosity average molecular weight of 10,000 or more is preferred. On the other hand, in the case of having an extremely high molecular weight, an operating pressure for filtration by a polymer filter increases, whereby a viscosity average molecular weight of 50,000 or less is preferable for executing the present invention.

In the present invention, the polycarbonate formed through polymerization may be filtered directly, or it may be filtered after the polymerization catalyst contained in the polymer has been deactivated.

As a catalyst deactivator to be used for deactivating the polymerization catalyst, known catalyst deactivators are effective, and among them, ammonium salts and phosphonium salts of sulfonic acid are preferred; and ammonium salts and phosphonium salts of dodecylbenzenesulfonic acid such as dodecylbenzenesulfonic acid tetrabutylphosphonium salt and dodecylbenzenesulfonic acid tetrabutylammonium salt, and ammonium salts and phosphonium salts of p-toluenesulfonic acid such as p-toluenesulfonic acid tetrabutylphosphonium salt or p-toluenesulfonic acid tetrabutylammonium salt are especially preferred.

Further, an ester of sulfonic acid is also a preferable catalyst deactivator. As esters of sulfonic acids, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate and the like are preferred.

Among these compounds, dodecylbenzenesulfonic acid tetrabutylphosphonium salt is the most preferred.

The quantity of use of such a catalyst deactivator is in a range of 0.5 to 50 moles, preferably 0.5 to 10 moles, more preferably 0.8 to 5 moles based on one mole of an above-mentioned polymerization catalyst selected from alkali metal compounds and/or alkaline earth metal compounds.

Such a catalyst deactivator or other additives are added directly or as a solution or a dispersion using an appropriate solvent or polymer, or as a master pellet to a molten polycarbonate, and the mixture is kneaded. Although there is no particular limitation to an apparatus used for performing these operations, for example, a twin screw extruder or the like is preferred, and in the case where a catalyst deactivator or another additive has been dissolved or dispersed in a solvent, a twin screw extruder having a vent is especially preferred.

Further, each reference numeral in the figures has the following meaning.

1. Filtration container.
2. Flange plate.
3. Polymer inlet passage.
4. Filter presser.
5. Leaf disc-type filter.
6. Spacer.
7. Center-pole.
8. Fixture nut.
9. Sealing packing.
10. Polymer flow passage.
11. Hollow polymer passage.
12. Boundary having a curved surface.
13. Fixture bolt.
14. Hollow flow passage.
15. Boundary having no curved surface.

EXAMPLES

Examples of the present invention are shown hereinafter. The Examples are for exemplifying the present invention, and the present invention is not restricted by them.

Example 1

A polycarbonate was filtered after it had been molten and kneaded with a twin screw extruder, by using a filtration apparatus as shown in FIG. 1, wherein the filtration apparatus comprising a filtration container having a polymer inlet passage and an open part, as well as a flange plate engaging with the opening part, and wherein a filter presser and a center pole was integrated; the cross section of the center pole was substantially triangular; the contact length of the portions where the outer circumference of the center pole was in contact with the inner circumference of a leaf disc-type filters was 1 mm; the cross-sectional area of a polymer passage continuously changed from the upstream side to the downstream side of the polymer flow so that the cross-sectional area of the polymer passage on the most downstream side of the center pole (regarding the polymer flow in the center pole, the cross-sectional area of the polymer passage at the position of the leaf disc-type filter existing at the most distant position from the polymer inlet passage 3) was 1.5 times the cross-sectional area of the polymer passage on the most upstream side (regarding the polymer flow in the center pole, the cross-sectional area of the polymer passage at the position of the leaf disc-type filter existing at the nearest position to the polymer inlet passage 3); and further the boundary (corner) between the surface substantially perpendicular to the center pole which was also on the filtration container side of the flange plate, and the other surface, had a curvature of 3 mm. The aperture of the leaf disc-type filters was 20 μm and the filtration area was 0.3 m².

At a polycarbonate filtration rate of 400 kg/hr per 1 m², 60 tons of the polycarbonate in total was filtered at 270° C.

After the filtration was completed, the remained polycarbonate was removed with a solvent, and then, the inside of the filtration apparatus was inspected under white light and ultraviolet-fluorescent lamps, and no remained substances were detected.

The polycarbonate used in the example was a polymer having a viscosity average molecular weight of 15,200 obtained from bisphenol A and diphenyl carbonate used as raw materials through transesterification in the presence of bisphenol A disodium salt and tetramethyl ammonium hydroxide as catalysts.

Comparative Example 1

A polycarbonate was filtered after it had been molten and kneaded with a twin screw extruder, by using a filtration apparatus having the structure as shown in FIG. 3, wherein a filter presser and a center pole were separated from each other, a filter presser was fixed to the center pole with a fixing bolt, the external cross-sectional shape of the center pole was hexagonal, the center pole had such a structure that the filtered polymer flowed through a polymer passage formed by the outer circumference of the center pole, the grooves carved on the center pole part and the inner circumferences of the leaf disc-type filters, and entered, as appropriate, into plural hollow passages formed in the flow direction, the contact length of the portions where the outer circumference of the center pole was in contact with the inner circumferences of the leaf disc-type filters was 4 mm, the cross-sectional area of the polymer passage of the center pole was not changed from the most upstream side to the most downstream side, and further, the surface substantially perpendicular to the center pole which was also on the filtration container side of the flange plate, and the other surface, were at right angles to each other at the boundary (corner) in-between and the boundary had no curved surface. The aperture of the leaf disc-type filters was 20 μm and the filtration area was 0.3 m².

At a polycarbonate filtration rate of 400 kg/hr per 1 m², 60 tons of the polycarbonate in total was filtered at 270° C.

After the filtration was completed, the remained polycarbonate was removed with a solvent, and then, the inside of the filtration container was inspected under white light and ultraviolet-fluorescent lamps. Adhered residual substances which had been discolored in brown were detected at a fixing bolt, at the apexes of the hexagonal center pole, at the communication holes connecting the polymer passage formed by the outer circumference of the center pole, the grooves carved on the center pole part and the inner circumferences of the leaf disc-type filters, to the hollow passage of the center pole, and at the boundary between the surface substantially perpendicular to the center pole which was also on the filtration container side of the flange plate, and the other surface.

The residual substances had luminescence from white to orange under an ultraviolet-fluorescent lamp, and it was shown that the substances were gels formed by the retention of polymer.

The polycarbonate used in this example was a polymer having a viscosity average molecular weight of 15,200 obtained from bisphenol A and diphenyl carbonate used as raw materials through transesterifrcation, in the presence of bisphenol A disodium salt and tetramethyl ammonium hydroxide as catalyst.

Industrial Field of Application

The present invention can solve the above-mentioned problems accompanied by prior arts, efficiently remove foreign materials by using a polymer filter, and at the same time, suppress discoloring, crosslinking and gel formation which occur in the filter; and as a result, it can produce a polycarbonate having excellent quality.

What is claimed is:

1. A filtration apparatus for a polycarbonate comprising as constituent elements:
   (a) a filtration container having a polymer inlet passage and an opening;
   (b) a flange plate interfitting with the opening;
   (c) one or more leaf disc-shaped filters for filtering a polymer introduced into the filtration container through the polymer inlet passage;
   (d) a filter presser for fixing the disc-shaped filters to each other and applying sealing pressure on junction parts of the leaf disc-shaped filters; and
   (e) a center pole placed on a space formed by inner circumferences of the leaf disc-shaped filters, for collecting the polymer filtered by the leaf disc-shaped filters and for discharging it outside the filtration apparatus, and integrated with the filter presser, wherein the center pole includes a penetration part that penetrates the flange plate, the flange plate has a sealing part for preventing the intrusion of a polymer down along the center pole into the penetration part of the center pole on a filtration container side of the flange plate, and the flange plate has a fixture nut for fixing the center pole with the flange plate on a side opposite to the filtration container of the flange plate.

2. A filtration apparatus according to claim 1 characterized in that the center pole has a polymer flow passage through an inner side thereof on a portion corresponding to a section where the center pole penetrates the flange plate.

3. A filtration apparatus according to claim 1 characterized in that a shape of a cross section of the center pole is substantially a polygon shape having plural apexes and a length of each portion where the center pole is in contact with the inner circumference of the leaf disc-shaped filter is 3 mm or less on the cross section.

4. A filtration apparatus according to claim 1 characterized in that a cross-sectional area of a polymer flow passage which forms between the center pole and the inner circumferences of said filters increases continuously as it goes downstream along the polymer flow.

5. A filtration apparatus according to claim 1 characterized in that a boundary formed between a surface (a) substantially perpendicular to the center pole which is on a filtration container side of the flange plate, and a surface other than this surface (a) is a curved surface having a curvature of 1 mm or more.

6. A filtration apparatus according to claim 1, further comprising polycarbonate having a viscosity average molecular weight of 10,000 or more.

7. A filtration apparatus according to claim 6 characterized in that the polycarbonate is manufactured by polymerizing an aromatic diol compound and a carbonic acid diester compound with or without a catalyst present.

8. A process for filtering polycarbonate comprising the steps of:
   providing a filtration apparatus according to any one of claims 1 to 5;
   passing polycarbonate into said filtration container through said polymer inlet passage;
   passing polycarbonate through said one or more leaf disc-shaped filters;
   collecting filtered polycarbonate from said filters with said center pole; and,
   discharging filtered polycarbonate to the outside of said filtration apparatus with said center pole.

* * * * *